United States Patent [19]

Krzywanos et al.

[11] Patent Number: 5,630,673
[45] Date of Patent: May 20, 1997

[54] PIVOT JOINT ASSEMBLY

[75] Inventors: Ronald F. Krzywanos, Aurora; Timothy A. Schaper, Plano, both of Ill.

[73] Assignee: Caterpillar Inc., Peoria, Ill.

[21] Appl. No.: 582,245

[22] Filed: Jan. 3, 1996

[51] Int. Cl.$^6$ .................................................. F16C 11/00
[52] U.S. Cl. ........................... 403/158; 403/154; 403/162
[58] Field of Search ....................................... 403/154, 155, 403/156, 157, 158, 161–163, 39, 11, 208; 414/725, 715; 172/273; 37/188, 103

[56] References Cited

U.S. PATENT DOCUMENTS

| | | | |
|---|---|---|---|
| 3,554,588 | 1/1971 | Reinsma et al. | 403/154 |
| 3,964,152 | 6/1976 | Shankwitz et al. | 29/427 |
| 3,997,274 | 12/1976 | Iverson | 403/10 |
| 4,096,957 | 6/1978 | Iverson et al. | 214/145 |
| 4,243,341 | 1/1981 | Kabay et al. | 403/158 X |
| 4,251,182 | 2/1981 | Schroeder | 403/158 X |
| 4,398,862 | 8/1983 | Schroeder | 414/723 |
| 4,607,977 | 8/1986 | Varnelis et al. | 403/154 |
| 4,629,350 | 12/1986 | Siewert et al. | 403/162 X |
| 4,652,167 | 3/1987 | Garman | 403/158 |
| 4,772,150 | 9/1988 | Horton | 403/163 X |
| 4,961,667 | 10/1990 | Reinsma et al. | 403/11 |
| 5,044,812 | 9/1991 | Arndelt et al. | 403/154 |

FOREIGN PATENT DOCUMENTS 8200181  1/1982  WIPO ..................................... 403/288

*Primary Examiner*—Harry C. Kim
*Attorney, Agent, or Firm*—William C. Perry

[57] ABSTRACT

A maintenance free pivot joint is disclosed that mounts a first member to a second member for relative rotation therebetween. The first member is positioned between a pair of brackets defined by the second member and both members define a plurality of bores aligned along a common axis (X). A pin assembly is positioned within the aligned bores and is secured on one end to one of the brackets and permits a small amount of axial and rotational movement of the pin assembly to allow the pin assembly to seek its own center upon connection of the two members to reduce wear and ease assembly.

16 Claims, 2 Drawing Sheets

PIVOT JOINT ASSEMBLY

TECHNICAL FIELD

This invention relates to a pivot joint assembly that is positioned between two relatively rotating members and more particularly to a pivot joint assembly between two components of a construction machine that may be easily assembled and whose maintenance is greatly reduced.

BACKGROUND ART

Construction machinery typically incorporates linkages and implements that have several relatively rotating components. In most instances, these joints require daily maintenance to insure that there is plenty of lubrication between the components to aid in movement and reduce wear. The lubrication that has been used most commonly is grease. The grease is forced into each joint through a grease jerk under pressure by a grease gun. In many instances, the linkage arrangement has several joints, many of which are in a relatively remote location. Servicing of these pivot joints can be very arduous and time consuming which in the long run adds to the cost of machine operation.

In some instances, pivot joints have been provided that have a relatively permanent supply of lubricating oil maintained within a pin assembly or cartridge that makes up a portion of the pivot joint. These joints have been known to work quite well in reducing the required maintenance of the linkage assembly. The only drawback that exists with these types of joints occurs when service is required in the field or in a location remote from the factory or fully equipped service area. Since the components of the linkage arrangements for construction machines can be quite large, sometimes weighing thousands of pounds, manipulation of these components for alignment is often quite difficult. In some designs the construction of the pivot joint requires critical spacing of the relatively rotating components. During assembly, for instance, proper clearance between the components is required during their initial alignment to prevent the damage of the seals. While this can be done quite easily with proper equipment in a service department, it is a more difficult task in the absence of that equipment.

In still other instances, a pivot joint assembly may incorporate a mounting assembly that must be secured on both ends thereof to prevent unwanted relative rotation between the two components. In many designs the pin member is secured on both end portions thereof to one or more of the components to prevent this unwanted rotation. This increases the complexity of the design as well as time and effort required for the assembly and disassembly of the joint.

The present invention is directed to overcoming one or more of the problems set forth above.

DISCLOSURE OF THE INVENTION

In one aspect of the present invention a pivot joint is provided between a first and second relatively rotating members. The first member has a first end portion that defines a bore that extends therethrough. The second member has a pair of laterally spaced first and second brackets extending therefrom, each of which defines a bore that extends therethrough. The first and second components are positioned such that the brackets of the second member are on opposing sides of the first member and the bores of both members are aligned on a common axis. A bushing member is fixedly secured within the bore of the first member. A pin member is provided that has a first and second end portion and is slidably received within the bushing member. A first collar is slidably positioned between both the bore defined in one of the brackets and the pin member. Likewise, a second collar is slidably received in the bore defined by the other of the bracket members and fixedly secured to the pin member. A seal plate is secured to the first end portion of the pin member and is adapted for sealing engagement with the pin member and the first collar. A first seal means is positioned between the first collar and the bushing and a second seal means is positioned between the second collar and the bushing. A means for securing the pin member and the first and second collars within the aligned bores of the first and second members is provided that is connected between one of the brackets and the second end portion of the pin member and is adapted to maintain the axial and rotational orientation of the pin member with respect to the aligned bores.

In another aspect of the present invention a pivot joint is provided between a first member having a bushing secured therein and a second member having first and second brackets positioned on opposite sides of the first member. Each bracket defines a pair of bores that are aligned with the bushing of the first member along a common axis. A pin assembly is positioned within the aligned bores and has a pin member slidably positioned within a bore defined by the bushing. A first collar is positioned about a first end portion of the pin member and is slidably positioned within the bore of the first bracket and is slidably positioned about the pin member. A second collar is fixedly positioned on a second end portion of the pin member and is slidably positioned within the bore of the second bracket. The first and second collars are sealably engaged with opposing end faces defined by the bushing. A reservoir is provided in the pin assembly for communicating lubricating fluid to the interface between the pin member and the bushing. A means for securing the pin assembly within the aligned bores is included and is connected to the second bracket to provide preselected axial and rotational orientation of the pin assembly with respect to the first and second members.

With a pivot joint as set forth above, the entire pin assembly may be positioned between within the aligned bores defined by the two relatively rotating members and utilize an interference fit on only one end of the pin assembly. In doing so, the components that house the seal means may be slid into position after the components have been aligned. This alleviates the possibility of incurring damage to the seals upon installation. In addition, the mounting of the pin assembly occurs between one end of the pin member and only one of the components. The mounting means incorporates a small amount of play in both the radial and axial directions to allow for a small amount of misalignment between the two components and to allow the components of the pin assembly to seek their own centerline of operation. This aids in assembly and decreases the amount of binding of components within the pin assembly and ultimately increases the life of the entire joint structure.

BEST MODE FOR CARRYING OUT THE INVENTION

Figure 1:
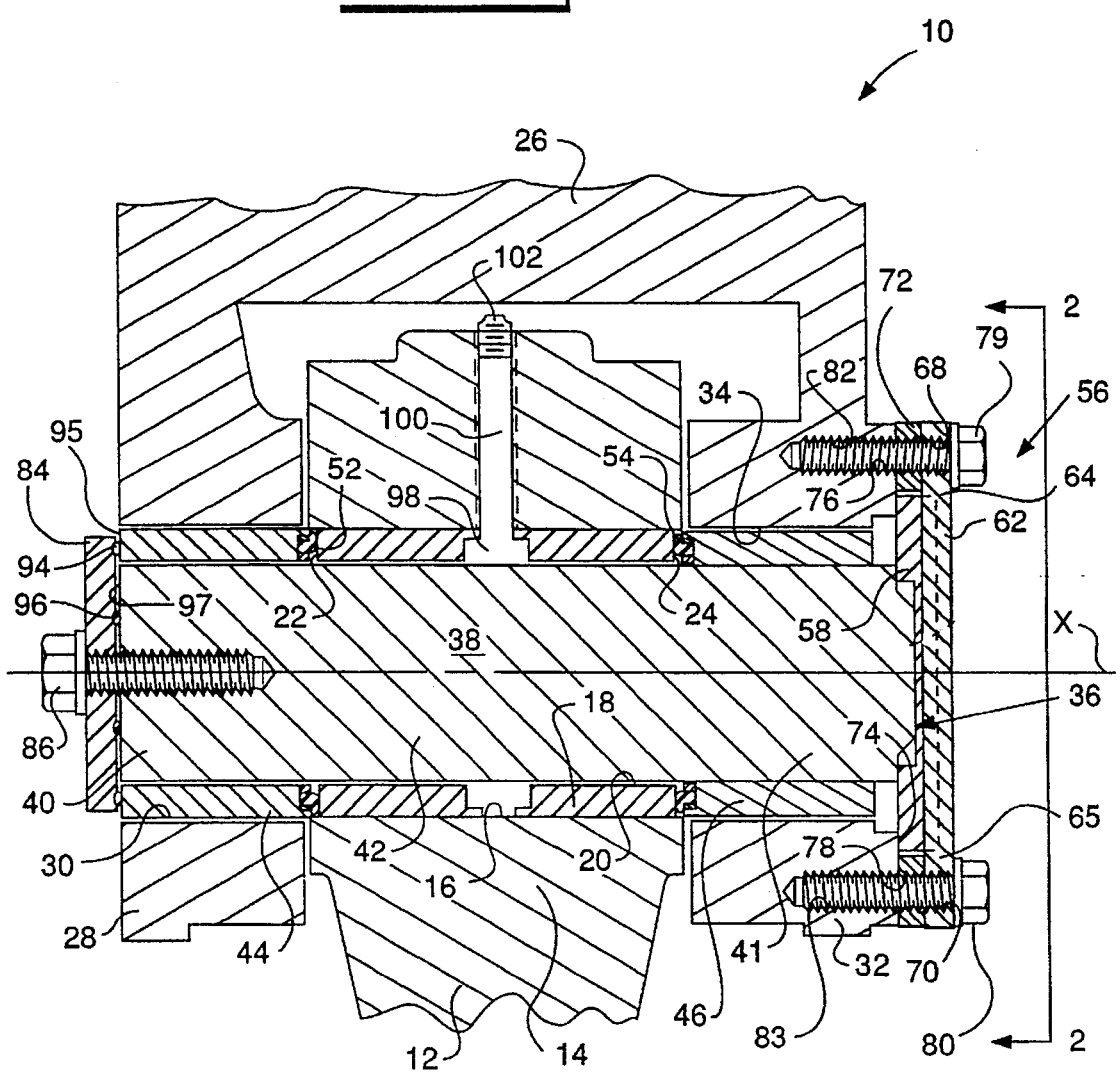
FIG. 1 is a diagrammatic cross-sectional view of a pivot joint assembly that embodies the principles of the present invention.

Referring now to the drawings, it can be seen that a pivot joint assembly is generally shown at 10. The pivot joint assembly 10 connects two members together for relative rotation with one another. While this pivot joint assembly could be used to connect any number of components together it will be described herein in conjunction with a linkage arrangement for a construction machine. In a linkage arrangement, there are numerous pivot joints that may utilize the subject pivot joint assembly 10. For example, the connection between the lift arms and the machine, the tilt lever and the lift arms and the lift arms and the bucket, just to name a few. In every situation, one of the components, or first member 12, defines a first end portion 14 that has a bore 16 defined therethrough. Fixed within the bore 16 is a bushing 18 that is secured in the bore 16 by interference fit, also known as a "press fit". The bushing 18 also has a bore 20 extending along its entire length and defines a pair of substantially planar end faces 22 and 24 on opposing sides of the bushing.

A second member 26 defines a pair of bifurcated flanges or brackets that are positioned on opposite sides of the first member 12. A first bracket 28 defines a mounting bore 30 and a second bracket 32 likewise forms a second mounting bore 34. The mounting bores 30 and 34 are aligned with one another along a common axis "X". The first and second brackets 28 and 32 are laterally spaced from one another a sufficient distance to receive the first member 12 therebetween. The first member is situated such that the bore 20 of the bushing 18 is also aligned along axis "X".

A pin assembly 36, or pin cartridge, is positioned within the aligned bores 20, 30 and 34 to secure the first and second members 12 and 26 together. A pin member 38 has a first end portion 40 that is substantially positioned within the bore 30 of the first bracket and a second end portion 41 that is substantially positioned within the second mounting bore 34 of the second bracket 32. The central portion 42 of the pin member 38 is substantially positioned within the bushing 18. A first collar 44 is positioned within the mounting 30 bore and has an external diameter that is slightly less than that of the bore and an internal diameter the is slightly more than that of the pin member 38. This relationship allows the first collar 44 to be slidably positioned on the pin and within the bore without interference.

A second collar 46 is secured on the second end portion 41 of the pin member 38 by means of an interference fit. The location of the collar 46 with respect to the pin member 38 is such that the second collar is positioned substantially within the bore 34 in the second bracket 32. The second collar has an outer diameter that is slightly less than that of the bore 34 so that it may be positioned therein without interference.

A pair of seal assemblies 52 and 54 are adapted for positioning about the pin member 38 between the respective collars 44 and 46 and the bushing 18. Seal assembly 52 is positioned for engagement with the end face 22 of the bushing 18, while seal assembly 54 is positioned for engagement with the opposite end face 24 of the bushing.

Figure 2:
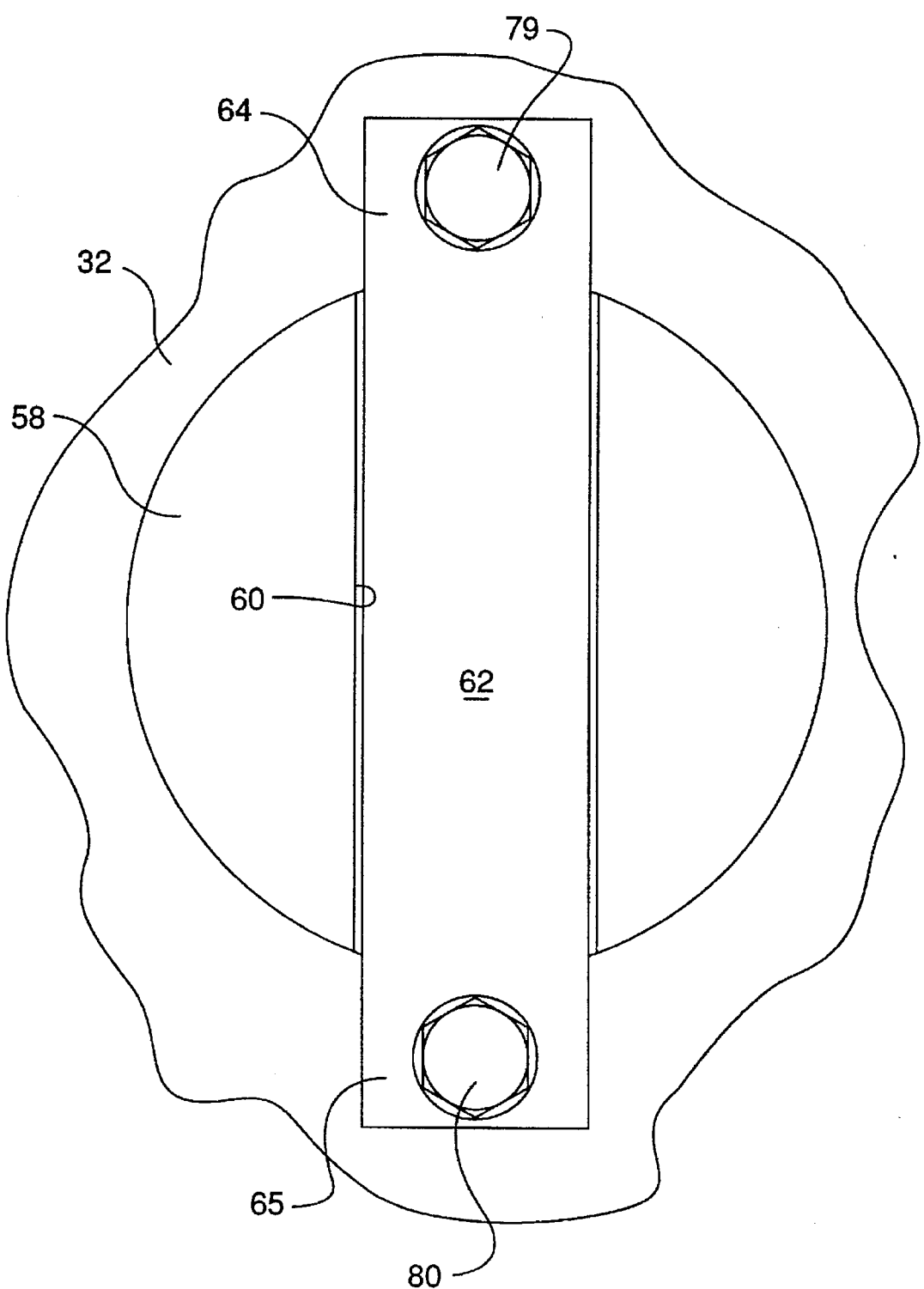
FIG. 2 is a diagrammatic end view, shown in elevation, and taken along lines 2—2 of FIG. 1.

The pin assembly 36 is secured in this position by a securing means 56 that is connected between the second end portion 41 of the pin member 38 and the second bracket 32. The securing means includes an end plate 58 that is permanently connected, by welding for example, to the second end portion 41 of the pin member 38. Referring mainly to FIG. 2 in can be seen that the end plate is disc shaped and has a diameter larger than the pin member so that it extends radially in all directions from the pin member. The end plate 58 has a slot or channel 60 that extends the entire length thereof. A retaining plate 62 is positioned within the slot 60 and has first and second end portions 64 and 65 respectively that extend beyond the periphery of the end plate 58. Each end portion 64, 65 defines a mounting hole 68 and 70 respectively. The widths of the retaining plate 62 and slot 60 are preselected so that the width of the slot is slightly wider than that of the plate to allow a small amount of relative rotation therebetween. A spacer ring 72 is positioned between the retainer plate and the outer surface 74 of the second bracket 32. The spacer plate defines at least a pair of mounting holes 76 and 78 that are aligned with the mounting holes 68 and 70 respectively of the retaining plate to receive a pair of suitable fasteners such as bolts 79 and 80. The bolts 79 and 80 are in turn threadably received within a pair of threaded mounting holes 82 and 83 formed in the second bracket 32. The thickness of the spacer plate is preselected with respect to the thickness of the end plate 58 to permit a slight amount of axial endplay, if desired, of the pin member 38 with respect to the aligned bores 20, 30 and 34.

A seal plate 84 is secured to the first end portion 40 of the pin member 38 by a suitable fastener such as a bolt 86 that is threadably engaged with the pin member. The seal plate 84 is generally round and has a diameter that is large enough to engage both first collar 44 and the pin member. A pair of O-rings 94 and 96 are captured between the seal plate and the respective first collar 44 and the pin member 38. The O-rings are radially spaced from one another so that O-ring 94 will sealingly engage and end face 95 of the first collar 44 and O-ring 96 will sealingly engage an end face 97 of the pin member 38.

A cavity 98 is centrally formed in bushing 18 and combines with the diametral difference between the outside diameter of the pin member 38 and the internal diameters of both the bushing 18 and the first collar 44 to form a fluid reservoir. The reservoir can be of sufficient size for maintaining enough lubricating fluid that will last substantially the life of the pin joint. The reservoir may be filled through a passage 100 that is formed in the first member and positioned for communication with the cavity 98. Plug member 102 closes off the passage and may be inserted and removed to fill the cavity as needed during initial assembly or during re-assembly as required through normal servicing of the pivot joint assembly 10. The seal assemblies 52 and 54 and the O-ring seals 94 and 96 combine to seal the reservoir to prevent the fluid from draining from the reservoir and to prevent foreign matter from entering.

Industrial Applicability

During use in a typical environment such as a loader linkage of a construction machine, the pivot joint 10 is positioned between two relatively rotating members of the linkage. For example, the first member 12 could correspond to a lift arm and the second member 26 could be represented by a work implement mounted to the lift arm. In most instances such as this, the work implement is caused to tilt with respect to the lift arm. When this occurs, the pin member 38 is mounted for rotation with the work implement through the connection of the securing means 56 to the second bracket 32 of the work implement. As this happens, relative rotation will occur between the interface of the central portion 42 of the pin member and the bore 20 of the bushing. This interface is constantly in communication with the cavity 98 and is always bathed in lubricating oil to aid in the relative rotation of the two components and to reduce the wear therebetween.

Upon the assembly of the pivot joint 10, the first end portion 14 of the lift arm 12 is moved into a position that is generally centrally located between the first and second brackets 28 and 32 with the bore 20 of the busing aligned along axis X. With the second collar 46 having been pressed onto the second end portion of the pin member 38 at a preselected location and the seal assembly 54 positioned inwardly adjacent the second collar 46, the pin member is inserted into the aligned bores 20, 30 and 34. The pin member is inserted into the aligned bores until the seal assembly 54 engages the end face 24 of the bushing 18 and the end plate 58 engages the outer surface 74 of the second bracket 32. When located as such, the central portion 42 of the pin member 38 is slidably received within the bore 20 and the second collar 46 is slidably received within the mounting bore 34. The first end portion 40 of the pin member is located within the bore 30 defined by the first bracket. The first collar 44 is then slidably mounted on the pin member and is slidably received within the bore 30 until the seal assembly 52, which has been positioned in inwardly adjacent relation to the first collar 44, engages the end face 22 of the bushing 18. No interference fit exists between any of these components.

The seal plate 84 is then secured to the pin member 38 by bolt 86 which is threadably received within the pin member to secure the position of the first collar 44 axially on the pin member. When secure, the O-ring 94 is compressed against the end face 95 while O-ring 96 is compressed against the end face 97 of the pin member 38 to provide a seal for the fluid within the reservoir.

To secure the entire pin assembly 36, the spacer ring 72 is placed about the end plate 58 with the mounting holes 76 and 78 in registry with holes 82 and 83 of the second bracket member 32. The retaining plate 62 is then positioned within the slot 60 of the end plate 58 with the mounting holes 68 and 70 defined by the respective first and second end portions 64 and 65 in registry with the holes 76 and 78 of the spacer ring 72. Bolts 79 and 80 are threaded into the mounting holes 82 and 83 to secure the retaining plate and thus the end plate 58 to the second bracket 32 for rotation with the second member or work implement 26.

With a pivot joint assembly as set forth above, only one interference fit exists in the entire assembly—that being between the second collar 46 and the pin member 38. This alleviates the need to precisely position the first and second components with one another before the pin assembly is installed. This is exceptionally beneficial when installation is done in the field. In addition, the pin assembly is located both axially and radially by one retaining mechanism that is connected to the second bracket 32 of the second member. Being so connected, a minimal amount of play, both axial and rotational, may be permitted in the mounting of the pin member to allow the pin member to seek its own centerline between the aligned bores. In doing so, a small amount of misalignment may be accommodated thus reducing impingement on one or more of the components of the pin assembly and thereby increasing the overall life of the pivot joint.

Other aspects, objects and advantages of this invention can be obtained from a study of the drawings, the disclosure and the appended claims.

We claim:

1. A pivot joint, comprising:

a first member having a first end portion having a bore defined therethrough;

a second member having a pair of laterally spaced first and second brackets extending therefrom, each of said brackets defining a bore that extends therethrough, said bores being aligned about a common axis, said brackets being positionable on opposing sides of the first member with the bore of the first member also positioned about the common axis;

a bushing fixedly secured within the bore of the first member;

a pin member having a first and second end portions and being slidably received within the bushing;

a first collar slidably positioned between both the bore defined in one of the brackets and the pin member;

a second collar slidably received in the bore defined by the other of the brackets and fixedly secured to the pin member;

a plate secured to the first end portion of the pin member, said plate being adapted for sealing engagement with the pin member and the first collar;

a first seal means positioned between the first collar and the bushing;

a second seal means positioned between the second collar and the bushing; and means for securing the pin member and the first and second collars within the aligned bores of the first and second members, said securing means being connected between one of the brackets and the second end portion of the pin member and being adapted to maintain an axial and rotational orientation of the pin member with respect to the aligned bores.

2. The pivot joint as set forth in claim 1 wherein the securing means is connected to the second bracket and is adapted to accommodate a preselected amount of relative movement between the pin member and the first and second members in an axial and radial direction.

3. The pivot joint as set forth in claim 1 wherein the securing means further includes:

an end plate secured to the second end portion of the pin member, said plate having a slot of a preselected width formed therein;

a retaining plate being adapted for positioning within the slot to provide a limited amount of relative rotation between the pin member and the retaining plate;

a spacer means having a preselected thickness and being adapted for positioning between the second bracket and the retaining plate to establish an axial positioning of the pin member within the aligned bores; and means for fastening the retaining plate to the second bracket.

4. The pivot joint as set forth in claim 3 wherein the retaining plate has a width less than that of the slot formed in the end plate to allow relative movement between the pin member and the retaining plate to accommodate small amounts of misalignment between the bores in the respective first member and the first and second brackets.

5. The pivot joint as set forth in claim 3 wherein the retaining plate has first and second end portions having mounting holes formed therein, said retaining plate being positioned in the slot of the end plate with the respective end portions of the retaining plate extending beyond the terminal ends of the end plate and being adapted to receive the fastening means to secure the retaining plate to the second bracket with the end plate sandwiched therebetween.

6. The pivot joint as set forth in claim 5 wherein the spacer means includes a plate member having a preselected thickness, said plate member being positioned between the retaining plate and the second bracket, said thickness being selected with respect to the thickness of the end plate to establish a preselected amount of relative axial movement between the end plate and the retaining plate to accommodate a limited amount of variation in the axial positioning between the pin member and the aligned bores.

7. A pivot joint between a first member having a bushing secured therein and a second member having first and second brackets positioned on opposite sides of the first member, each bracket defining a bore that is aligned with the bushing of the first member along a common axis, comprising:

a pin assembly positionable within the aligned bores having a pin member slidably positioned within a bore defined by the bushing, a first collar positioned about a first end portion of the pin member and being slidably positionable within the bore of the first bracket and slidably positioned about the pin member, a second collar fixedly positioned on a second end portion of the pin member and slidably positionable within the bore of the second bracket, said first and second collars being sealably engaged with opposing end faces defined by the bushing, and a reservoir for communicating lubricating fluid to the interface between the pin member and the bushing; and means for securing the pin assembly within the aligned bores, said securing means being connectable to the second bracket to provide preselected axial and rotational orientation of the pin assembly with respect to the first and second members.

8. The pivot joint as set forth in claim 7 wherein a seal plate is mounted to the first end portion of the pin member in a manner to be in sealing engagement with the pin member and the first collar.

9. The pivot joint as set forth in claim 7 wherein the reservoir includes a cavity defined by the bushing, said cavity being in communication with the interface between the pin member and the bushing and the interface between the pin member and the first collar.

10. The pivot joint as set forth in claim 9 wherein a first seal member is positioned between the first collar and a first end face defined by the bushing, and a second seal member is positioned between the second collar and a second end face defined by the bushing, said first and second seal members being adapted to prevent the egress of lubricating fluid from the reservoir and the ingress of foreign matter into the reservoir.

11. The pivot joint as set forth in claim 9 wherein a seal plate defines a seal between the first collar and pin member to prevent the egress of lubricating fluid from the reservoir.

12. The pivot joint as set forth in claim 7 wherein an end plate is secured to the second end portion of the pin member and defines a slot that extends the entire length of the end plate.

13. The pivot joint as set forth in claim 12 wherein the securing means includes a retaining plate that is positionable within the slot defined by the end plate and means to secure the retaining plate to the second bracket to substantially prevent the relative rotation of the pin member with respect to the second bracket.

14. The pivot joint as set forth in claim 13 wherein the width of the retaining plate is less than that of the slot defined in the end plate by a preselected amount to permit a limited amount of relative rotation therebetween.

15. The pivot joint as set forth in claim 14 wherein a spacer plate is positionable between the retaining plate and the second bracket, said spacer plate having a thickness that is preselected with respect to that of the end plate to permit a selected amount of axial movement of the pin member within the aligned bore, said limited amount of axial movement being coupled with the limited amount of relative rotation to permit the pin assembly to seek its own centerline upon complete assembly of the pivot joint.

16. The pivot joint as set forth in claim 7 wherein the first member is a lift arm of a loader linkage and the second member is a work implement mounted thereon.

* * * * *